Nov. 28, 1944.  G. A. BEAUMONT  2,363,496
PIG IRON AND PROCESS FOR MAKING SAME
Filed July 22, 1941  4 Sheets-Sheet 1
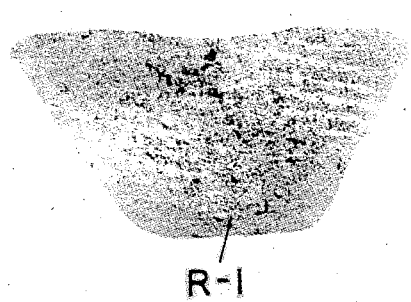
R-1
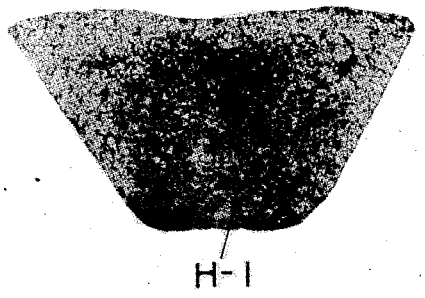
H-1
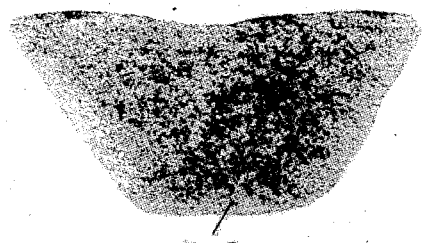
R-2
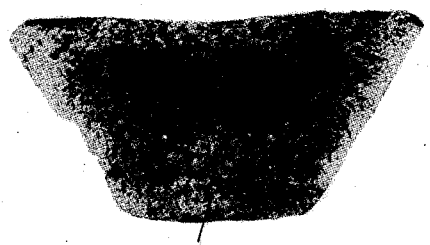
H-2
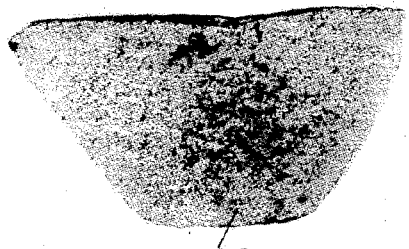
R-3
H-3
*Fig. 2.*
*Fig. 1.*
INVENTOR
GLENN A. BEAUMONT
BY Fay, Macklin, Gohrick,
Williams, Chilton and Isler.
ATTORNEYS Nov. 28, 1944.　　　G. A. BEAUMONT　　　2,363,496
PIG IRON AND PROCESS FOR MAKING SAME
Filed July 22, 1941　　　4 Sheets-Sheet 4

H-1

H-2

H-3

INVENTOR.
GLENN A. BEAUMONT
BY
ATTORNEYS

Patented Nov. 28, 1944

2,363,496

UNITED STATES PATENT OFFICE 2,363,496

PIG IRON AND PROCESS FOR MAKING SAME

Glenn A. Beaumont, Buffalo, N. Y., assignor to The Hanna Furnace Corporation

Application July 22, 1941, Serial No. 403,485

8 Claims. (Cl. 75—50)

This invention relates to the production of pig iron.

Research has shown that physical characteristics of pig iron persist to a considerable degree through remelting in the cupola and appear in the castings produced therefrom. Inasmuch as pig iron has a very extensive market for use in the production of castings, it is of particular importance that a good grade of pig iron be used in the casting metal. Obviously it is desirable that in production pig iron attain as many as possible of the properties required in cast metal.

An object of the present invention is the production of a close grained pig iron having well distributed graphite flakes of small dimension. Another object is the production of a fine grained or close grained pig iron, substantially free of cementite, having usually a predominately pearlitic matrix in which the shape, form, and distribution of graphite is controlled.

A still further object of the invention is the production of such a pig iron with the reduction, or, in some cases, the complete elimination of, the additions now prevalent in foundry practice and which are relatively expensive.

Other objects and advantages of the invention will be apparent during the course of the following description.

In the accompanying drawings, forming a part of this specification, and in which like numerals are employed to designate like parts throughout the same, Fig. 1 comprises three photographs of fractures of pigs, numbered H-1 to H-3, produced by this invention;

Fig. 2 comprises three photographs of fractures of pigs produced in the usual present day practice, numbered R-1 to R-3;

Figure 3:
Figs. 3 and 4 are photomicrographs of unetched polished specimens of pigs R-1 and H-1 respectively, taken at one hundred diameters.

The present methods of producing ordinary pig iron may develop many properties which are detrimental to castings. These properties generally arise from the shape and distribution of the graphite flakes. Large graphite flakes or graphite "strings" disrupt the continuity of the matrix. A controlling factor in the tensile strength of the material is often the graphite condition. Improper distribution, particularly clustering of these flakes, accentuates this weakness.

Heretofore in foundry practice such difficulties have been partially overcome by additions of pure metals, metallic alloys or chemical compounds to the charge or melt. To some degree these additions control the shape, size and form of the graphite, and tend to effect a close or fine grained structure.

In the production of pig iron it is common practice to tap the molten iron into a ladle, whence it is poured at once into the pig molds.

I have discovered that the following process, in which a critical temperature range is observed, serves to control the form, shape, and distribution of the graphite and the nature of the matrix material.

In my present process molten iron, produced by the usual blast furnace practice from an ordinary type charge, is held for a predetermined time in a molten body, as in the ladle, to allow it to cool down to within a predetermined temperature range. The ordinary type of charge referred to is essentially free from special ingredients intended to reduce the grain size.

Before casting into pigs I prefer that the molten iron be transferred to another container whence it is poured into the pig molds. This may be conveniently done by transferring from the tapping ladle to a pouring ladle. The temperature of the iron should be between 2350° F. and 2600° F. when it is reladled into pigs. This differs from the present common practice in that the temperature when pouring into the molds is normally approximately 2700° F. to 2800° F.

In practice I have found that grain and graphite control is dependent to a surprising degree upon the variations in the temperature of reladling or pouring into pigs, as this process is preferably practiced. Reladling pouring temperature of approximately 2400° F. produces excellent results. The transfer above mentioned effects an agitation or stirring contributing to the desired results.

The product of my process is non-porous, soft, easily machinable, and has a high density with a close-grain structure, as well as a very good form, size, and distribution of graphite. An unusually high strength material results with this structure. As above noted, little cementite appears.

Pig iron produced in accordance with this invention has the appearance of a very good grade of cast iron and has the physical characteristics thereof. With the use of this type of pig iron, the cupola charging formulae which usually call for a large percentage of steel scrap, other metals, metallic alloys, or chemical compounds can be modified to include a larger proportion of the cheaper pig iron and correspondingly to decrease the use of the more expensive steel scrap and other additions of which the supply is becoming more limited.

The following table gives the chemical composition of my process pigs of Fig. 1.

| Pig | Si | S | Mn | P |
|---|---|---|---|---|
|  | Percent | Percent | Percent | Percent |
| H-1 | 2.18 | .037 | 1.14 | .172 |
| H-2 | 2.90 | .025 | .98 | .422 |
| H-3 | 3.14 | .020 | .91 | .454 |

Figure 7:
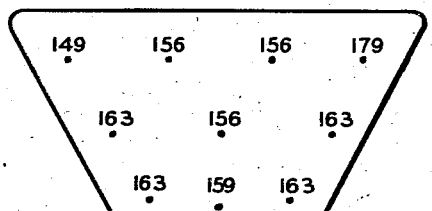
Fig. 7 shows the Brinell hardness values at various points across the face of each of the fractured pigs produced by my invention, and shown in Fig. 1.
Figure 7:
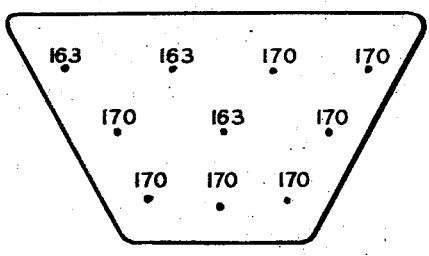
Figure 7:
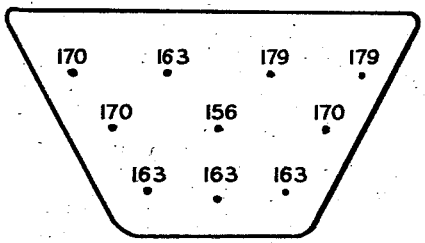

The close grained structure of the material manufactured by this process is apparent to the naked eye in the fracture specimens in this figure, and the superiority over that of ordinary pig iron shown in Fig. 2 is obvious. Fig. 7 further shows the superiority of our product in degree of hardness and uniformity of the cast pig structure.

Figure 4:
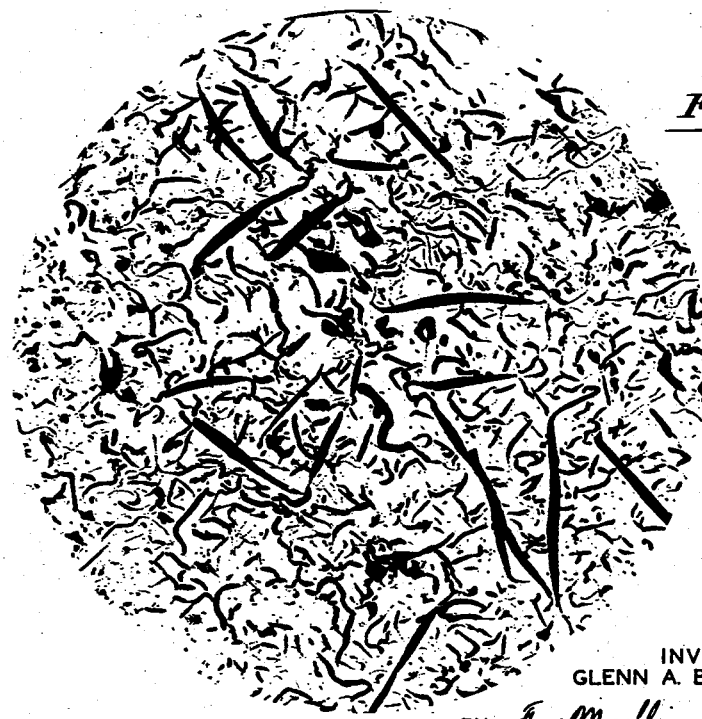

The photomicrographs of Figs. 3 and 4 show the superiority of structure over the regular pig of the product of my invention, produced without any comparatively expensive addition. The graphite flakes of this product are finer, more evenly distributed and of a more suitable shape than the corresponding regular pig. This structure results in a stronger iron due to increased continuity of the matrix. There are no clusters or long strings appearing in the graphite form of our product whereas in the regular product graphite flakes or strings of considerable length, and clusters of large size are often apparent. The absence of these large grained graphite forms, which act precisely as cracks in the structure, contributes to higher strength of my iron. The process of this invention uniformly and consistently produces a product having the aforementioned improved properties.

Figure 5:
Fig. 5 is a photomicrograph taken at one thousand diameters of an etched polished specimen of an ordinary pig.
Figure 6:
Fig. 6 is a photomicrograph taken at one thousand diameters of an etched polished specimen of a typical pig produced by this invention of chemical composition similar to the pig of Fig. 5.

The photomicrographs of a typical specimen of ordinary pig shown in Fig. 5 is taken at one thousand diameters and shows a very thick, long grained, clustered graphitic structure. Fig. 6 is a similar photograph of a specimen of my product with a composition corresponding to that of the sample shown in Fig. 5. A very fine flake and uniformly distributed graphitic structure is seen. Furthermore, it is seen that this iron produced in our process retains all the characteristics of good pig iron having a structure with the usual amount of ferrite.

Extensive use of my pig iron by customers having a great variety of cast products has proven that the improved characteristics of the pig iron of this invention persist through the remelting in the cupola to appear in the cast products, without the inclusion of grain refining materials in the cupola formulae.

I claim:

1. In the process of making fine grain pig iron, the steps of smelting iron bearing materials to produce molten pig iron, holding the iron in a molten body for a time interval sufficient to cool the molten body about 200° to 400° F. and down to a temperature of approximately 2400° F., transferring the molten iron from one container to another during said interval, and pouring the molten iron into pigs while at said temperature, the temperature of the molten pig iron becoming lower from the tapping until said pouring.

2. In the process of making fine grain pig iron, the steps of smelting iron bearing materials to produce molten pig iron, tapping the molten pig iron from the furnace at the usual temperatures of 2700° to 2800° F., holding the molten iron in a body for an interval sufficient to cool the molten body from the tapping temperature down to a temperature within the range of 2600° F. to 2350° F. and then pouring the iron into pigs while its temperature is within said range, and whereby the pig iron is constantly cooling from the time it leaves the furnace.

3. In the process of making fine grain pig iron, the steps of smelting iron bearing materials to produce molten pig iron, drawing off the molten pig iron at the usual tapping temperatures of 2700° to 2800° F., then holding said iron in a molten body while cooling during a period of time to lower the temperature of the molten body from tapping temperature down to within a range of 2600° F. to 2350° F., transferring the molten iron from one container to another while cooling continues, and then pouring the molten iron into pigs while its temperature is within said range.

4. In the process of making fine grain pig iron, the steps of smelting iron bearing materials to produce molten pig iron after smelting, holding the iron in a molten body for a time interval sufficient to cool the molten body from the tapping temperature of about 2750° F. down to a temperature within the range of 2600° F. to 2350° F. and then pouring the iron into pigs while its temperature is within said range, said molten body from the time the molten pig iron first leaves the furnace until it is poured into pigs being at no time subjected to a heating operation.

5. In the process of making fine grain pig iron, the steps of smelting iron bearing materials to produce molten pig iron, tapping the iron into a container at temperatures of about 2700° F. to 2800° F. and holding the iron in a molten body for a sufficient time interval to cool the iron down to a temperature within the range of 2600° F. to 2350° F., agitating the molten body during said time interval, and then pouring the iron into the pig molds while within the latter temperature range.

6. In the process of making fine grain pig iron, the steps of smelting iron bearing materials to produce molten pig iron, tapping off the iron into a container at a temperature of about 2700° F. to 2800° F., holding the iron in a molten body in the first container for a time interval sufficient to cool it down to a temperature of approximately 2400° F., agitating the molten body and casting the iron into pigs at approximately the latter temperature.

7. In the process of making fine grain pig iron, the steps of smelting iron bearing materials to produce molten pig iron, tapping the molten iron from the furnace into a container, then holding the iron in a molten body for a sufficient time interval to insure cooling the iron down through a range of about 200° to a temperature within a range between 2600° F. to 2350° F., agitating the molten body of iron during said time interval and while cooling, and then pouring the iron into pig molds while within said temperature range of 2600° F. to 2350° F.

8. In the process of making fine grain pig iron, the steps of smelting iron bearing materials to produce molten pig iron, tapping the molten iron from the furnace at temperatures substantially above 2600° F., then holding the iron in a molten body for a time interval sufficient to cool the molten body to insure lowering its temperature through about 200° to 400° F. and down to within a range of 2400° F. to 2600° F., transferring the molten iron from one container to another during said time interval, and then pouring the molten iron into pigs while its temperature is in said range of 2400° F. to 2600° F., the temperature of the molten pig iron becoming lower from the tapping until said pouring.

GLENN A. BEAUMONT.